Patented Nov. 3, 1925.

1,560,380

UNITED STATES PATENT OFFICE.

GEORGES DE HÉDOUVILLE, OF LONGWY, AND PIERRE PIPEREAUT, OF PARIS, FRANCE.

MANUFACTURE OF CRYSTALLIZED ZINC SULPHIDE.

No Drawing.   Application filed January 2, 1924.   Serial No. 684,058.

*To all whom it may concern:*

Be it known that we, GEORGES DE HÉDOUVILLE and PIERRE PIPEREAUT, citizens of the French Republic, and residents of Longwy, Meurthe et Moselle, and Paris, France, have invented certain new and useful Improvements in the Manufacture of Crystallized Zinc Sulphide, of which the following is a specification.

Our present invention relates to the manufacture of crystallized zinc sulphide and has for its object to provide a dry process of manufacturing crystallized zinc sulphide, that is one which does not require either precipitation or washing and which is carried into practice by simple fusion.

Primarily our improved process consists in calcining solid zinc salts containing oxygen within a gas-tight oven, through which a current of hydrogen sulphide gas is caused to pass either alone or a mixture of hydrogen sulphide and sulphur dioxide.

If sulphate of zinc is used and the same is for instance incompletely dry and heated in a closed oven, such salt will produce sulphur dioxide and sulphuric acid, which in presence of an excess of hydrogen sulphide will produce the following reactions:

$$SO_2 + 2H_2S = 3S + 2H_2O \quad (1)$$

and $$H_2SO_4 + H_2S = S + SO_2 + 2H_2O \quad (2)$$

These are the principal reactions, and besides a very small quantiy of products of the thionic series will be obtained.

The reaction (1) may be in part produced artificially by suitably injecting additional sulphurous gas.

As will be seen from the above reaction, hydrogen sulphide gas need not be dried to enter into reaction.

Until a certain point one may think that the zinc sulphate will be finally converted to zinc sulphide by the action of sulphur in a vapour condition on said compound, although sulphur will not be used in its initial condition in our present process. Our improved manufacture may be represented, if sulphate of zinc is to be treated, for instance, by the following reactions:

$$2ZnSO_4 + 4H_2S = 2ZnS + 2SO_2 + 4H_2O + 2S \quad (3)$$

and $$3ZnSO_4 + 4H_2S = 3ZnS + 4SO_2 + 4H_2O \quad (4)$$

produced in a closed oven at a temperature varying between 250° C. and the red heat.

The reaction (3) corresponds to the case of an excess of $H_2S$ gas. In fact it will be seen that sulphur will be distilled at the outlet of the apparatus, while the reaction (4) corresponds to the case where the zinc sulphate is in excess with relation to hydrogen sulphide gas and where only sulphur dioxide will be found at the end of the manufacture.

The conversion into zinc sulphide will be accomplished without it being necessary to agitate the mass, as at the time of production of $SO_4H_2$ and $SO_2$ the above mentioned reactions will take place.

Therefore it will be seen that: according to the working conditions, we may produce zinc sulphide and either sulphur or sulphur dioxide as a by-product, in cases where the zinc salt is sulphate of zinc. Such sulphur dioxide will not be mixed with air, it may be liquefied and discharged either in this condition or after being diluted with air used in the manufacture of sulphuric acid.

Thus it will be seen that if it is supposed that in the manufacture of zinc sulphide we use zinc blende, sulphuric acid and hydrogen sulphide are only intermediate bodies which are immediately brought back again into the cycle of operations. That is to say zinc blende or impure zinc sulphide will be converted to pure white, amorphous or crsytallized through the agency of—

1. Sulphuric acid upon zinc blende for the production of sulphate of zinc, and

2. Hydrogen sulphide acting on such sulphate said gas being produced by the action of diluted sulphuric acid on sodium sulphide for instance, and sulphate of sodium thus produced being reduced by coal, producing sodium sulphide again, or utilizing residual sulphur from the principal process for producing sodium sulphide.

Zinc sulphide manufactured according to our improved process may be obtained, according to the temperature, in an amorphous semi-crystallized or completely crystallized condition, by raising the temperature and prolonging the current of hydrogen sulphide gas.

Having now fully described our said invention, what we claim and desire to secure by Letters Patent, is:

1. A dry process of manufacturing crystallized zinc sulphide, which consists in causing hydrogen sulphide gas to act on solid oxygenated zinc compounds at a temperature from 250° C. to red heat, substantially as set forth.

2. A dry process of manufacturing crystallized zinc sulphide, which consists in causing hydrogen sulphide gas and sulphur dioxide in a dry condition to act on a solid oxygenated zinc compound at a temperature of from 250° C. to red heat, substantially at set forth.

3. A dry process of manufacturing crystallized zinc sulphide, which consists in causing hydrogen sulphide gas and sulphur dioxide in a moist condition to act on solid oxygenated zinc salts at a temperature of 250° C. to red heat, substantially as set forth.

4. A dry process of manufacturing crystallized zinc sulphide, which consists in causing hydrogen sulphide gas and sulphur dioxide to act on sulphate of zinc at a temperature of 250° C. to red heat, substantially as set forth.

In testimony whereof we have hereunto our hands.

GEORGES DE HÉDOUVILLE.
PIERRE PIPEREAUT.